(No Model.) 4 Sheets—Sheet 1.
A. COZE & A. LENCAUCHEZ.
APPARATUS FOR CHARGING GAS RETORTS.
No. 473,144. Patented Apr. 19, 1892.
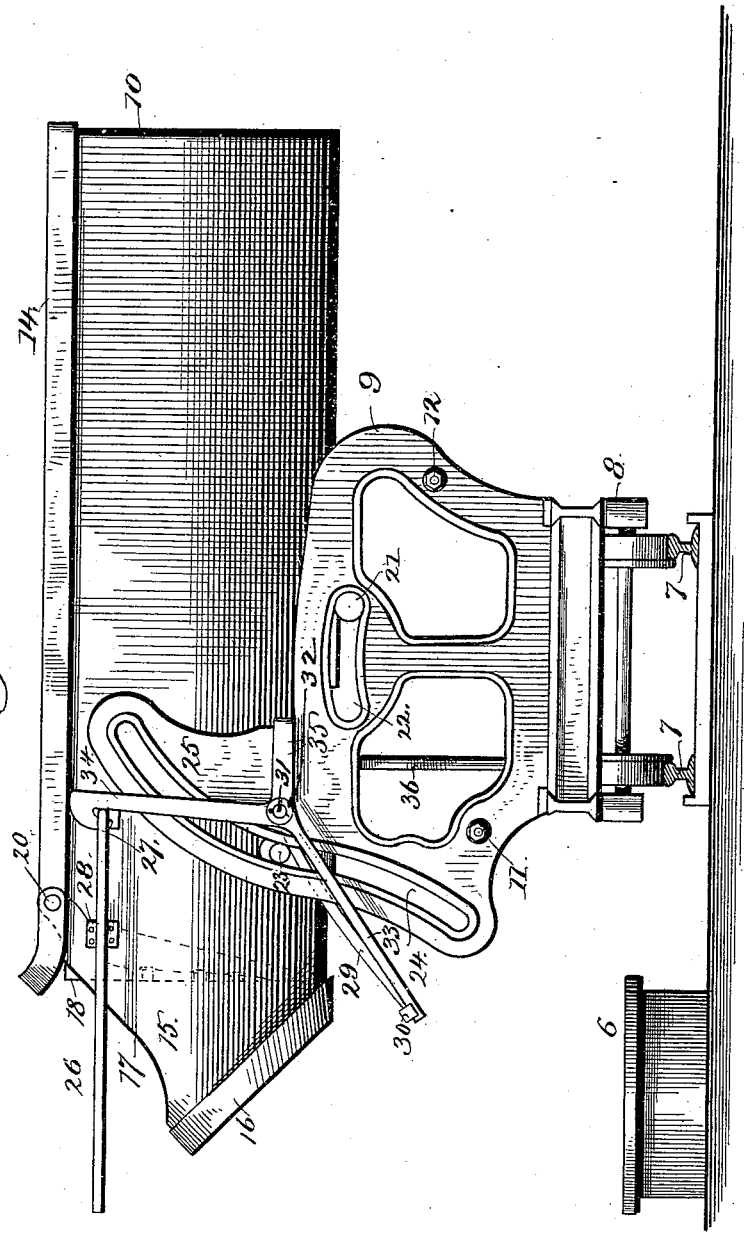

(No Model.) 4 Sheets—Sheet 2.
A. COZE & A. LENCAUCHEZ.
APPARATUS FOR CHARGING GAS RETORTS.
No. 473,144. Patented Apr. 19, 1892.
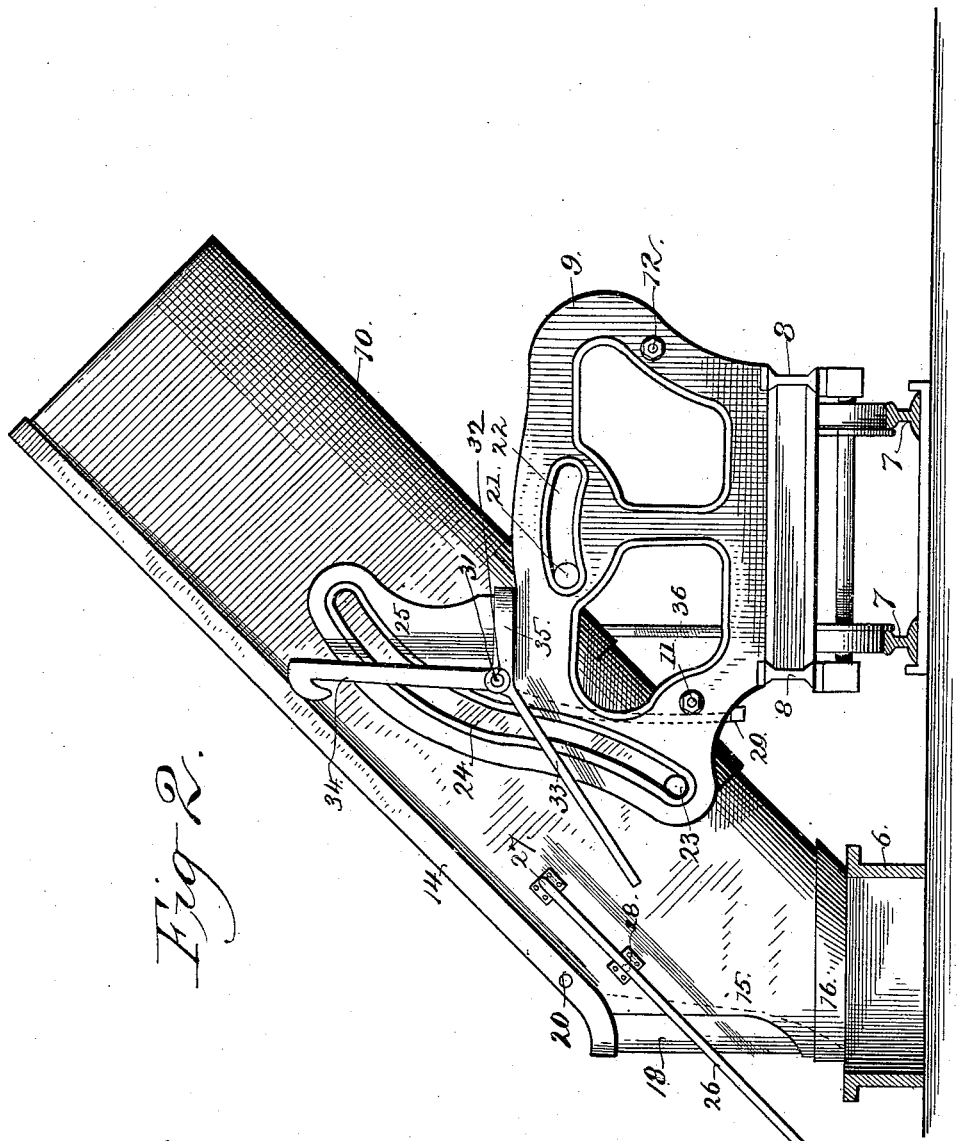
WITNESSES
J. W. Reynolds
Percy B. Hills
INVENTORS
A. Coze & A. Lencauchez
BY
Fowler & Fowler
ATTORNEYS.

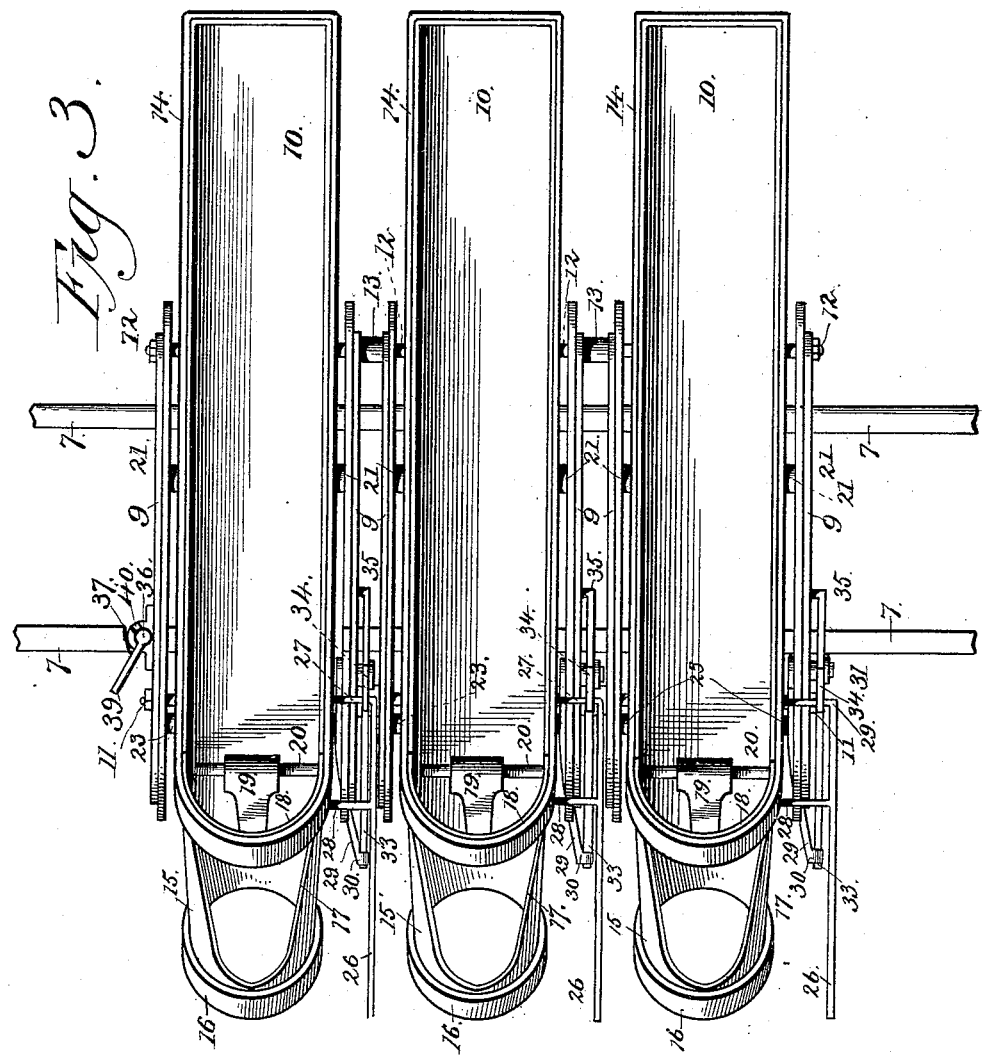

(No Model.) 4 Sheets—Sheet 4.
A. COZE & A. LENCAUCHEZ.
APPARATUS FOR CHARGING GAS RETORTS.
No. 473,144. Patented Apr. 19, 1892.
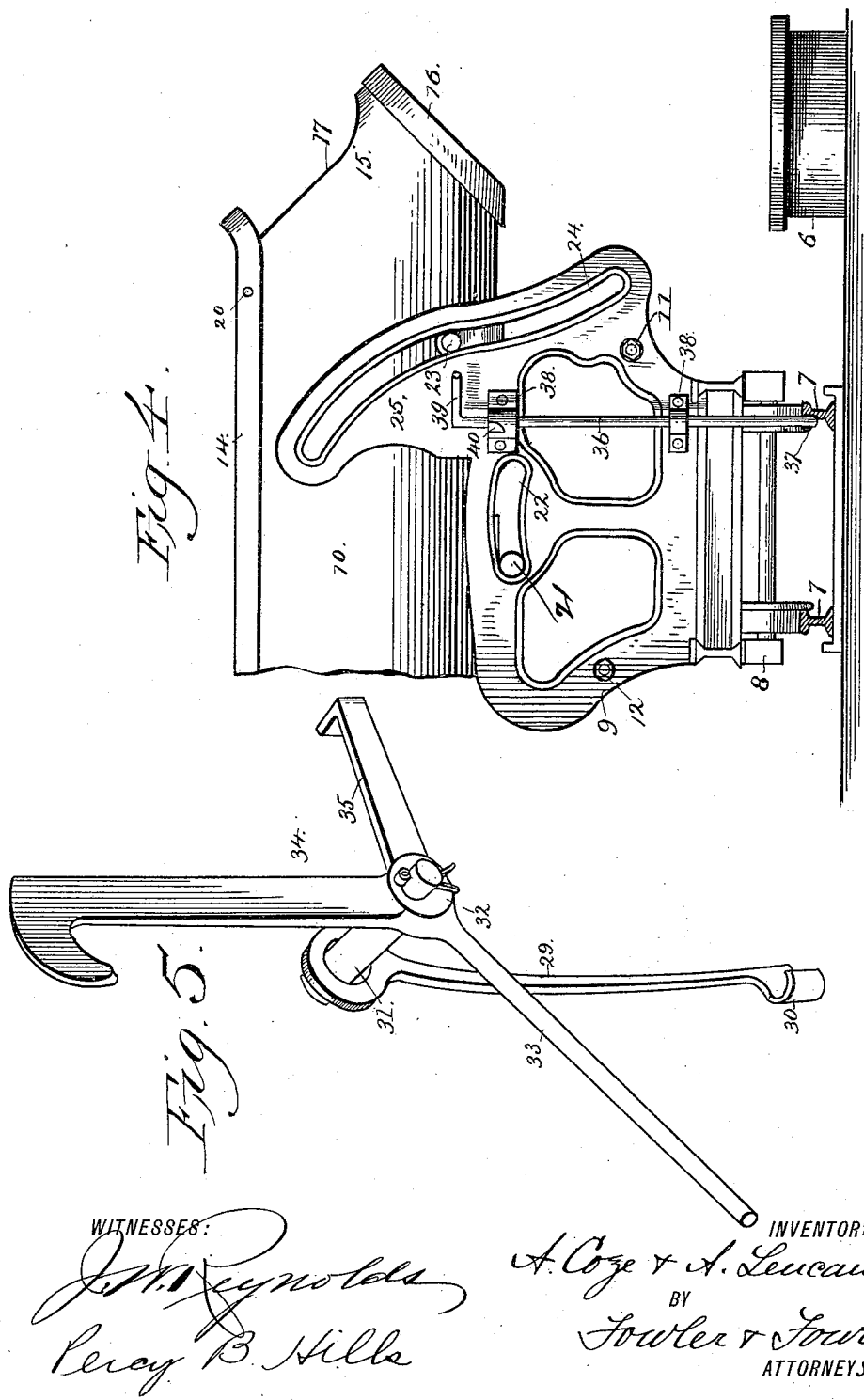
WITNESSES:
J. W. Reynolds
Percy B. Hills
INVENTORS
A. Coze & A. Lencauchez
BY
Fowler & Fowler
ATTORNEYS

UNITED STATES PATENT OFFICE.

ANDRÉ COZE AND ALEXANDRE LENCAUCHEZ, OF PARIS, FRANCE, ASSIGNORS, BY DIRECT AND MESNE ASSIGNMENTS, TO SOCRATES NEWMAN AND JAMES GREEN, OF ST. LOUIS, MISSOURI.

APPARATUS FOR CHARGING GAS-RETORTS.

SPECIFICATION forming part of Letters Patent No. 473,144, dated April 19, 1892.

Application filed November 28, 1890. Serial No. 372,763. (No model.) Patented in France August 30, 1889, No. 200,501.

*To all whom it may concern:*

Be it known that we, ANDRÉ COZE and ALEXANDRE LENCAUCHEZ, citizens of the Republic of France, and residents of Paris, in said country, have invented certain new and useful Apparatus for Charging Gas-Retorts, (for which we have obtained Letters Patent in France of fifteen (15) years' duration, dated August 30, 1889, No. 200,501,) of which the following is such a full, clear, and exact description as will enable any one skilled in the art to which it appertains to make and use the same, reference being had to the accompanying drawings, forming part of this specification.

The invention will be best understood by referring to the accompanying drawings, in which—

Figure 1 represents an end elevation in the locked position of a truck or dumping-car embodying our improvements. Fig. 2 represents a like view thereof in the discharging position. Fig. 3 represents a plan view of the said truck. Fig. 4 represents, partly broken away, an elevation of the opposite end of the truck to that shown in Fig. 1; and Fig. 5 represents in perspective and on a larger scale the details of the locking mechanism.

Similar numerals of reference indicate similar parts throughout the several views.

Referring to the drawings, 6 indicates the charging-mouths of retorts of the inclined type, as shown, for instance, in patent to A. Coze, No. 388,953, dated September 4, 1888. In front of such a range of retorts extends the trackway 7, upon which travels the truck or dumping-car 8.

The truck frame-work consists of a number of pairs of uprights 9, corresponding in number to the tilting hoppers 10, carried by the truck, each pair of uprights serving to support one of said hoppers. The uprights 9 are connected together by through-bars 11 12, having spacing-thimbles 13, said bars serving, moreover, as front and back stops, respectively, for the hoppers when in the forwardly and backwardly tilted positions.

In the drawings we have shown a truck provided with three tilting hoppers, all similarly constructed and arranged with respect to the uprights which support them. Each hopper consists of a trough-shaped main body portion having a reinforcing-band 14 along its upper edge and having an outwardly and downwardly inclined nose 15, terminating in an upwardly-inclined mouth 16. Above the mouth 16 the nose is cut away at 17, as shown, and in proximity to said cut-away portion is suspended the swinging gate or door 18 by means of a sleeved arm 19, loosely encircling the cross-rod 20. The said door or gate is somewhat larger than the cut-away portion of the tilting hopper, so that when the hopper is in the discharging position, as shown in Fig. 2, the outer portion of the mouth 16 will form a stop for the door or gate and so that the cut-away portion will be entirely covered by the door or gate, thereby preventing the escape of coal therethrough, while at the same time the door or gate serves to break the too rapid descent of the coal and prevents the large lumps from choking up the passage-way. When the hopper is in the horizontal position, as shown in Figs. 1 and 3, the door or gate forms an end piece therefor.

The hoppers are provided with roller-trunnions 21, engaging in elongated slots or bearings 22, formed in the uprights. They are also provided with pins 23, engaging in guide-slots 24, made in extensions 25 of the uprights, said guide-slots being of such curvature in relation to the axis of rotation as to insure the discharge of the coal into the mouth of the retort-chute whatever may be the angle of discharge. A handle-bar 26, having a bend at 27, serves as a means for manipulating the hopper and is strengthened by a short brace-piece 28.

When the hoppers are charged with coal and in transit, it is desirable to lock them securely in the horizontal position. To this end a locking device is provided consisting, primarily, of a rod 29, having a hooked end 30 and supported from the pin 31, which passes through the upright. On the opposite side of the upright a hub 32 is fixed upon the said pin 31 and is provided with a forwardly-extending arm 33, an upwardly-extending hooked arm 34, and a rearwardly-extending hooked arm 35. When the hopper is in the discharging position, the rod 29 hangs loosely out of the way of the guide-slot 24; but when the hopper is in the horizontal position the bend 27 of the handle-bar engages within the hooked end of the arm 34 and the rod 29 is raised and its hooked end 30 is sprung over the arm 33. The hooked end of the arm 34 therefore prevents the backward tilting of the hopper, and the rod 29, being locked in position directly beneath the pin 23, prevents forward tilting until the parts are released by disengaging the rod 29 from the arm 33. When it is desired for any reason (such as placing the cover of the retort-chute in position) to tilt the hopper backwardly, this may be effected by springing the upwardly-extending arm 34 outwardly a sufficient space to permit it to be out of the way of the handle-bend 27, whereupon the hopper may be tilted beyond said arm and until it rests upon the cross-bar 12.

The operation of the invention is apparent. The hoppers are locked in the horizontal position and after being charged are brought forward along the track until they stand opposite the retort-chutes. At this location the truck is locked to the track by means of a vertical bar 36, engaging in a slot 37, formed in one of the track-rails. This vertical bar passes through suitable guides 38 and is provided with a cam projection 40, fitting into a correspondingly-shaped recess or cut-away portion of the upper guide 38, as shown in Fig. 4, so that by slightly turning the bent handle end 39 of the bar said cam projection 40 will ride up the curved side of the cut-away portion, thereby raising the bar and disengaging it from the track-slot. When the truck is in place in front of the retort-chutes, the hoppers are unlocked and tilted forwardly, discharging their contents through the retort-chutes into the inclined retorts. They are then restored to the horizontal position and again locked in place preparatory to being returned to the charging-station to be reloaded for charging a further series of retorts.

What we claim is—

1. A truck for charging gas-retorts, provided with one or more hoppers having roller-trunnions adapted to move in journal-slots in the truck-frame and tiltable transversely to the body of the truck, a bent bar on the hoppers, and a hook on the frame adapted to engage with said bent bar to secure each hopper in a horizontal position, substantially as described.

2. A truck for charging gas-retorts, consisting of one or more tilting hoppers provided with roller-trunnions arranged in slots formed in the frame-work of the truck, and slots also formed in extensions of said frame-work engaged by pins carried by the tilting hoppers, said slots being of such curvature in relation to the axis of rotation as to insure the discharge of the coal into the mouth of the chute whatever may be the angle of discharge, substantially as described.

3. A truck for charging gas-retorts, provided with one or more tiltable hoppers, each hopper having at its forward end a discharge-nose, and a swinging gate hinged to the hopper within said discharge-nose, the discharge-nose having a stop to limit the outward swing of the gate, substantially as described.

4. A truck for charging gas-retorts, provided with one or more tiltable hoppers, each having at its forward end a discharge-nose outwardly and downwardly inclined when the hopper is in a horizontal position, the outlet-aperture of said nose being upwardly inclined and the outer side of said nose being cut away, and a gate corresponding in shape to the cut-away portion and hinged to the hopper in front thereof, substantially as described.

5. A truck for charging gas-retorts, provided with one or more tiltable hoppers, each hopper having roller-trunnions adapted to move in journal-slots in the truck-frame and having guide-pins adapted to move in guide-slots in said frame during the tilting operation, a hook-catch adapted to engage with the hopper when the latter is in a horizontal position and attached to the frame on one side of the guide-slots and having a forwardly-projecting rod, and a swinging lock-bar attached to the frame on the other side of the guide-slots and having a hooked projection adapted to be sprung over the said rod, substantially as described.

In testimony whereof we have hereunto set our hands and affixed our seals, this 5th day of November, 1890, in the presence of the two subscribing witnesses.

ANDRÉ COZE. [L. S.]
ALEXANDRE LENCAUCHEZ. [L. S.]

Witnesses:
ROBT. M. HOOPER,
ALBERT MOREAUX.